United States Patent [19]
Baisley et al.

[11] Patent Number: 5,978,587
[45] Date of Patent: Nov. 2, 1999

[54] METHOD FOR PROPAGATING SOURCE CODE LOCATIONS INTO OBJECTS IN A COMPILER

[75] Inventors: Donald Edward Baisley, Laguna Hills; Jonathan Virgil Ziebell, Trabuco Canyon, both of Calif.

[73] Assignee: Unisys Corp., Blue Bell, Pa.

[21] Appl. No.: 08/969,192

[22] Filed: Nov. 13, 1997

[51] Int. Cl.$^6$ .................................................. G06F 9/45
[52] U.S. Cl. ........................ 395/708; 395/707; 395/705
[58] Field of Search .................................. 395/704, 705, 395/707, 708

[56] References Cited

U.S. PATENT DOCUMENTS

| | | | |
|---|---|---|---|
| 5,339,431 | 8/1994 | Rupp et al. ............................. | 395/710 |
| 5,371,747 | 12/1994 | Brooks et al. ...................... | 364/267.91 |
| 5,555,419 | 9/1996 | Arsenault ................................ | 395/704 |
| 5,560,015 | 9/1996 | Onodera ................................. | 395/708 |
| 5,673,390 | 9/1997 | Mueller ................................... | 708/104 |
| 5,701,487 | 12/1997 | Arbouzov ................................ | 395/704 |
| 5,713,010 | 1/1998 | Buzbee et al. .......................... | 345/507 |
| 5,812,850 | 9/1998 | Wimble ................................... | 395/704 |
| 5,822,592 | 10/1998 | Zhu ......................................... | 395/705 |

OTHER PUBLICATIONS

"Efficient Method for Implementing Pre–Compiled Headers for C and C++"; IBM Technical Disclosure Bulletin; vol. 39, No. 4, pp. 165–170, Apr. 1996.

"Object–Oriented Assembler/Disassembler"; IBM Technical Disclosure Bulletin; vol. 38, No. 7, pp. 495–496, Jul. 1995.

Buksbaum, D.; "An Object–Oriented ATLAS Compiler"; Conference Proceeding of IEEE Systems Readiness Technology Conference, AUTOTESTCON '95; pp. 257–261, Sep. 1994.

Cooper, K.; Hall, M.; Torczon, L.; "Unexpected Side Effects of Inline Substitution: A Case Study"; ACM Letters on Programming Languages and Systems; vol. 1, No. 1, pp. 22–32, Mar. 1992.

"Method to Correlate Error Report to Source Code"; IBM Technical Disclosure Bulletin; vol. 29, No. 12, p. 5315, May, 1987.

*Primary Examiner*—Tariq R. Hafiz
*Assistant Examiner*—Brian Sattizahn
*Attorney, Agent, or Firm*—J. Ronald Richebourg; Steven R. Petersen; Mark T. Starr

[57] ABSTRACT

An object-oriented apparatus in the memory of a computer system for propagating source code locations into objects in a compiler. The apparatus has three types. The first is a source object type, of which each object identifies a source location and, where inlining has occurred, a list of inlined source locations. The second type is a source mark object type, of which each object identifies a source object to be related to new compiler objects, and whose construction using a source object starts the use of the source object for propagation into new compiler objects, and whose destruction ends the use of the source object for propagation. The third type is a source mapped base type for a compiler object that relates the compiler object to a source object, and whose default construction relates the compiler object to the source object of the most recently constructed source mark object.

7 Claims, 6 Drawing Sheets

METHOD FOR PROPAGATING SOURCE CODE LOCATIONS INTO OBJECTS IN A COMPILER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of compiling source programs into binary programs for execution on computing systems, and more particularly to the propagation of source code locations into objects in a compiler.

BACKGROUND OF THE INVENTION

A compiler is a computer program that reads source files of another program to produce a binary file, which is required for execution by a computer. The source files describe the program using a computer language such as C, C++, COBOL or the like. The binary file produced by the compiler contains a series of binary machine instructions for a particular type of computer. Moreover, the compiler generates diagnostic messages when it detects errors in the source files. A compiler is distinguished from an assembler by the fact that each input statement does not, in general, correspond to a single machine instruction or fixed sequence of instructions. A compiler may support such features as automatic allocation of variables, arbitrary arithmetic expressions, control structures such as FOR and WHILE loops, variable scope, input/output operations, higher-order functions and portability of source code.

A source file can contain compiler directives that cause other source files to be included. A compilation unit is a single source program file given to the compiler, plus all the source program files included directly or indirectly by that file. A binary file can contain machine instructions from one or more compilation units, and a compilation unit can come from multiple source files. Sometimes the machine instructions of a single compilation unit are saved in a separate binary file, called an object file. Object files are then combined by a linker to create a final binary file.

A compiler that has been programmed with the use of objects must relate its objects (representing a program being compiled) to locations within the source files. The parsing phase of compilation creates objects representing program elements, such as functions, statements and expressions. The code generation phase of compilation involves generating machine instruction objects for the program element objects. Locations in the source files must be captured and maintained for the program element objects and then passed on to the respective machine instruction objects. A source location usually consists of a source file name and a line number within the source file.

The compiler uses the source locations of its objects in at least two cases. First, the compiler shows a source location when issuing a diagnostic message to inform the compiler's user of an error location. Secondly, the compiler places a table in the binary file with the machine instructions mapping the instructions to their corresponding source locations. This table is used for debugging when the machine instructions are loaded from the binary file into a computer system's memory and executed. If processing of the machine instructions is interrupted, a debugger or other diagnostic software can use the table to find the source location that corresponds with the current point of execution of machine instructions. If call instructions are used, the debugger or other diagnostic software can also use the table to find the source locations of the series of calls that arrived at the interrupted machine instruction. The list of source locations, starting with the point of interruption followed by the source locations of the calls that arrived there in order of most recent call to first call, is referred to as a call history.

One type of prior art compiler processed a source file in a single pass by reading the source file and generating machine instructions at the same time. Typically included in this type of one-pass compiler are running variables holding the current source file name and line number, which are used to correlate between the original source file and the generated binary code. Such a straightforward correlation is adequate for a one-pass compiler but is too simplistic to cover most compiler requirements of today.

Many compilers today scan source files to create objects representing program elements. The compiler then makes multiple passes over the objects in order to verify correctness, find optimization opportunities and generate machine instructions. Some compilers then make one or more additional passes over the machine instructions to find still more optimization opportunities. Optimizations cause objects to be sometimes moved in their respective order and sometimes replaced by other new objects. These relocations and replacements happen to both program element objects and machine instruction objects. The prior art for relating machine instructions to source locations in typical multipass compilers uses two instance variables in each object. The first variable points at a source file name using either a memory address or an index into a table of names. The second variable holds a line number within the named file. These two variables, which must be set as objects, are created while scanning source files and then copied to other objects created in later passes, such as for optimization and code generation. In some compilers the two variables are combined into one variable that holds an index into a list of ranges of line numbers with source files.

A common and important optimization called "inlining" causes a major problem with the way source locations are managed by the prior art compilers. The term "inlining" as used herein shall mean the replacing of a function with an instance of the function's body. When a compiled program is interrupted, the locations of call instructions are used to look up source locations to build a complete call history. Inlining causes call instructions to be removed. A compiler copies the objects representing the body of an inlined function in place of a call on the function. Using the method of the prior art, each copied object can be related to only one source location. So the compiler can preserve either the location of the call or the location within the inlined function, but not both. The result is that a call history reported by a debugger or other diagnostic software is incomplete. Gaps in the call history resulting from inlining cause confusion and create misleading results.

Each object in a compiler whose origin is in source code must contain some form of reference to that source code. To accomplish this, current prior art compilers explicitly set instance variables in the objects as they are created. Because there are a great many types of such objects, and there are many situations in a compiler where objects are created, there is an enormous amount of code in the prior art compilers for tracking such information. A way to propagate source location information implicitly would help reduce a compiler's size and complexity resulting in fewer errors and easier maintenance.

SUMMARY OF THE INVENTION

The disclosed invention is an object-oriented apparatus in the memory of a computer system for propagating source code locations into objects in a compiler. The apparatus comprises three types. The first is a source object type, of which each object identifies a source location and, where inlining has occurred, a list of inlined source locations. The second type is a source mark object type, of which each object identifies a source object to be related to new compiler objects, and whose construction using a source object starts the use of the source object for propagation into new compiler objects, and whose destruction ends the use of the source object for propagation. The third type is a source mapped base type for a compiler object that relates the compiler object to a source object, and whose default construction relates the compiler object to the source object of the most recently constructed source mark object.

It is an object of the present invention to provide a new and improved computer-implemented method and apparatus for relating objects in a compiler to source program locations that overcomes the shortcomings and disadvantages of the prior art.

A feature of the present invention resides in the use of object-oriented programming to represent source file locations that become part of all objects representing programming elements and machine instructions.

Yet another feature of the present invention is the ability to accommodate the rearrangement and substitution of both program elements and machine instructions resulting from compiler optimization.

Still another feature of the present invention is the capability of supporting the propagation of source location information through the many objects within a compiler with convenience and low overhead.

An advantage of the present invention resides in the encapsulation of source location management in objects that can be readily adapted for use in any compiler using objects. This encapsulation simplifies the complexities of dealing with call histories where inlining has occurred.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims.

DETAILED DESCRIPTION OF ONE EMBODIMENT

A background of object oriented programming concepts and related definitions are set forth hereinbelow.

Object-oriented programming is defined as a method of implementation in which programs are organized as cooperative collections of objects, each of which represents an instance of some type. See a text entitled *Object-Oriented Analysis and Design,* by Grady Booch, 1994.

An object is an abstract representation of a real-world concept or thing—such as a person, a software package, or an event. In a computer system memory, the state of an object is represented by the values of instance variables defined for the object's type. For example, the state of a person object might be a name, birth date, spouse, etc.

The behavior of an object is the set of operations that the object can perform. In the computer system, the behavior of an object is represented by the operations defined for the object's type.

Objects in the memory of a computer system represent real-world or conceptual entities. An object occupies a portion of memory which contains named instance variables for storing information about the entity. An object also provides operations that can be performed by the computer processor for accessing and modifying the information.

Types

A type is a template that describes the instance variables and operations that an object possesses. A type defines a pattern that can be used to create or identify objects; it does not contain the actual object. A type can also be a base for other types.

Objects described by a type are called instances of that type. Types derived from a base type are called subtypes of that type. A type that is used to define only other types and not objects is said to be abstract.

The definition of a subtype identifies the base types from which it is derived. A type cannot be a subtype of itself. A subtype inherits all the instance variables and operations of its base types. It can be customized by adding new instance variables and operations. For example, a type called Manager defined as a subtype of Employee would inherit all the instance variables and operations of Employee and would define additional instance variables and operations of its own. An object of type Manager would then have all the instance variables defined by the Employee and Manager types, and would have all the operations defined by both types.

Instance Variables

The memory used by an object contains instance variables. Each instance variable has a type, which defines the range of values that can be stored in the variable.

Operations

An operation is a feature that represents a behavior that objects possess. The operations defined for a type form an interface that can be seen by users of objects of that type. An operation can have parameters that identify information a caller must provide when invoking the operation. If an operation has no parameters, a caller merely invokes the operation for the desired object.

Methods

Each operation must be implemented by a module of code called a method. A method is the steps performed to complete an operation.

Figure 1:
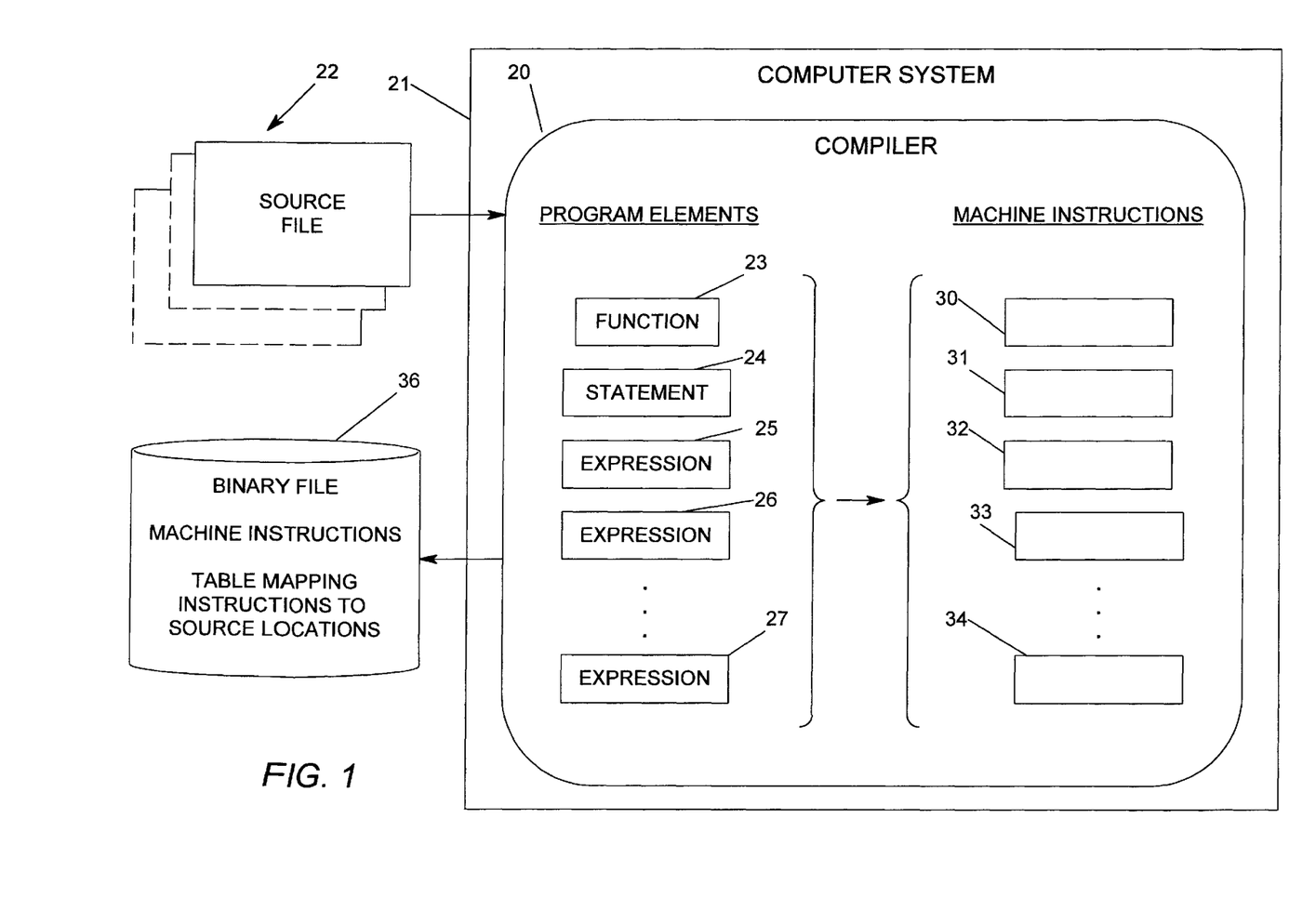
FIG. 1 is a block diagram illustrating the flow of information through a compiler running in a computer system, from source files to objects for program elements, and then to objects representing machine instructions, and finally, to a binary file.

Referring now to FIG. 1 a block diagram illustrates the flow of information through a compiler 20 running in a computer system 21. One or more source files 22 are provided as an input to the compiler 20 whereupon they are parsed to generate objects 23 through 27 for program elements. The objects 23–27 are then converted by the compiler to objects 30 through 34, which represent machine instructions. The machine instructions are then stored in a binary file 36. In accordance with the present invention, the binary file 36 includes a table mapping instructions to source locations.

The compiler 20, which has been programmed using objects, must relate its objects (representing a program being compiled) to locations within the source files 22. The parsing phase of compilation creates objects representing program elements, such as functions 23, statements 24 and expressions 25–27. A source location of one of these objects is generally shown as a source file name and a line number within the named source file. The code generation phase of compilation involves generating machine instruction objects for the program element objects. The source location of a machine instruction object is generally the same as the source location of the statement or expression for which the machine instruction was generated.

The compiler 20 uses the source locations of its objects in at least two cases. First, the compiler shows a source location when issuing a diagnostic message to inform the compiler's user of an error location. Secondly, the compiler puts a table in the binary file along with the machine instructions in order to map the instructions to their corresponding source locations. This table is used for debugging when the machine instructions are loaded from the binary file into a computer system's memory and executed. When processing is interrupted, a debugger or other diagnostic software can use the table to find the source location or inlined partial call history that relates to the current point of execution of machine instructions and can find the same information for each call instruction in the series of calls that arrived at the interrupted instruction in order to show a complete call history.

An example source program consisting of two source files, FILE1 and FILE2, is set forth below:

| LINE NO. | |
|---|---|
| FILE1 | |
| 1 | int f(int x) |
| 2 | {return 10 / x;} |
| FILE2 | |
| 1 | #include "FILE1" |
| 2 | int main ( ) |
| 3 | {int a, b; |
| 4 | a = f(10); |
| 5 | b = f(0); |
| 6 | return a + b;} |

EXAMPLE

Execution of the binary program resulting from compiling the files set forth in the example above with a C compiler is interrupted in function f in FILE 1 at line 2 when the machine instruction doing a divide operation tries to divide by zero. That is, the call history is (FILE1, line 2), (FILE2, line 5). The second source location in the call history is the place where function f is called when it is interrupted.

Table I below shows the information mapping machine instructions to source locations that would be stored along with the machine instructions in a binary file for the example above. Actual machine instructions are not shown. The first column of each table describes in words what would actually be numerical offsets into the stream of machine instructions stored in the binary file.

When function f is not inlined:

TABLE I

| Index into machine instructions for: | Corresponding source locations |
|---|---|
| return 10 / x | FILE2 line 2 |
| Allocation of a and b | FILE1 line 3 |
| call f(10) and assignment to a | FILE1 line 4 |
| call f(0) and assignment to b | FILE1 line 5 |
| return a + b | FILE1 line 6. |

When function f is inlined:

TABLE 2

| Index into machine instruction for: | Corresponding source locations |
|---|---|
| Allocation of a and b | FILE1 line 3 |
| 10 / 10 | FILE2 line 2, FILE1 line 4 |
| assignment to a | FILE1 line 4 |
| 10 / 0 | FILE2 line 2, FILE1 line 5 |
| assignment to b | FILE1 line 5 |
| return a + b | FILE1 line 6 |

Both tables allow a debugging tool or other diagnostic software to provide the same correct call history, using the call instruction in TABLE I, and the inlined call history in TABLE II.

For a compiler to use this invention, it must include and use three types. The types are Src (a source location or inlined call history), SrcMapped (a base type for objects related to source locations) , and SrcMark (a means of marking a source location to be associated with objects being created). Each of these types is amplified hereinbelow. These types comprise the entire interface to the invention by a compiler. Other types, also described below, are used internally within the invention.

Figure 2:
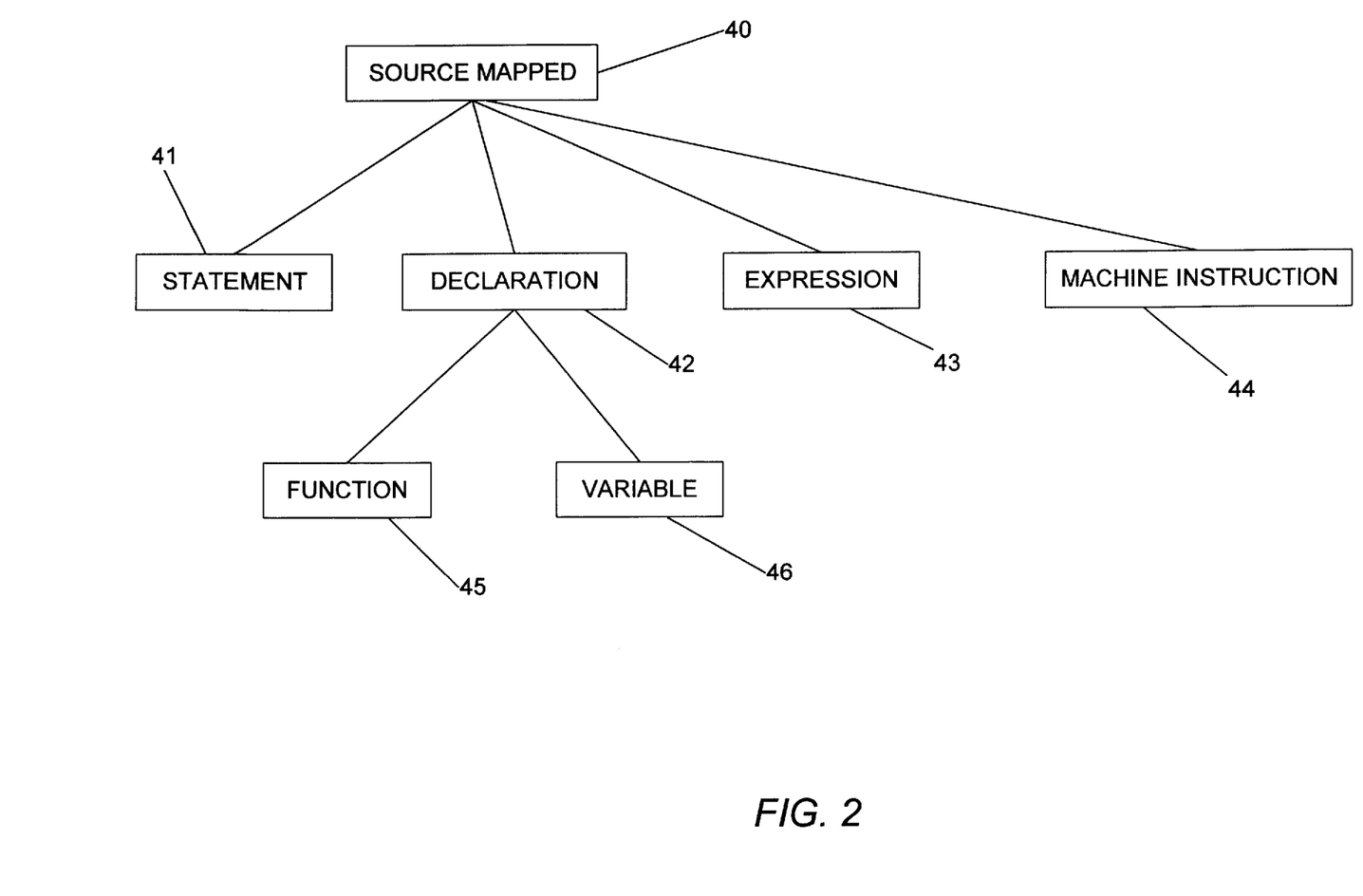
FIG. 2 is an inheritance diagram showing the source mapped ("SrcMapped") type as a base type of the many other types typically used in a compiler.

Referring now to FIG. 2 wherein is shown an inheritance diagram of the Source Mapped ("SrcMapped") type 40 as a base type of the many other types typically used in the compiler 20. Specifically, SrcMapped is the base type of the many types of compiler objects associated with source locations and is a part of the present invention. Statements 41, declarations 42, expressions 43 and machine instructions 44, which are part of any compiler, are made subtypes of the base type SrcMapped 40. Additionally, functions 45 and variables 46 are subtypes of the subtype declarations 42. Statements 41, declarations 42, expressions 43, machine instructions 44, functions 45 and variables 46 are typical of types found in all compilers using objects. However, it is the integration of SrcMapped 40 as a base type of all of these subtypes in the compiler (whose objects need to correspond to source locations) that forms the basis of the present invention.

Figure 3A:
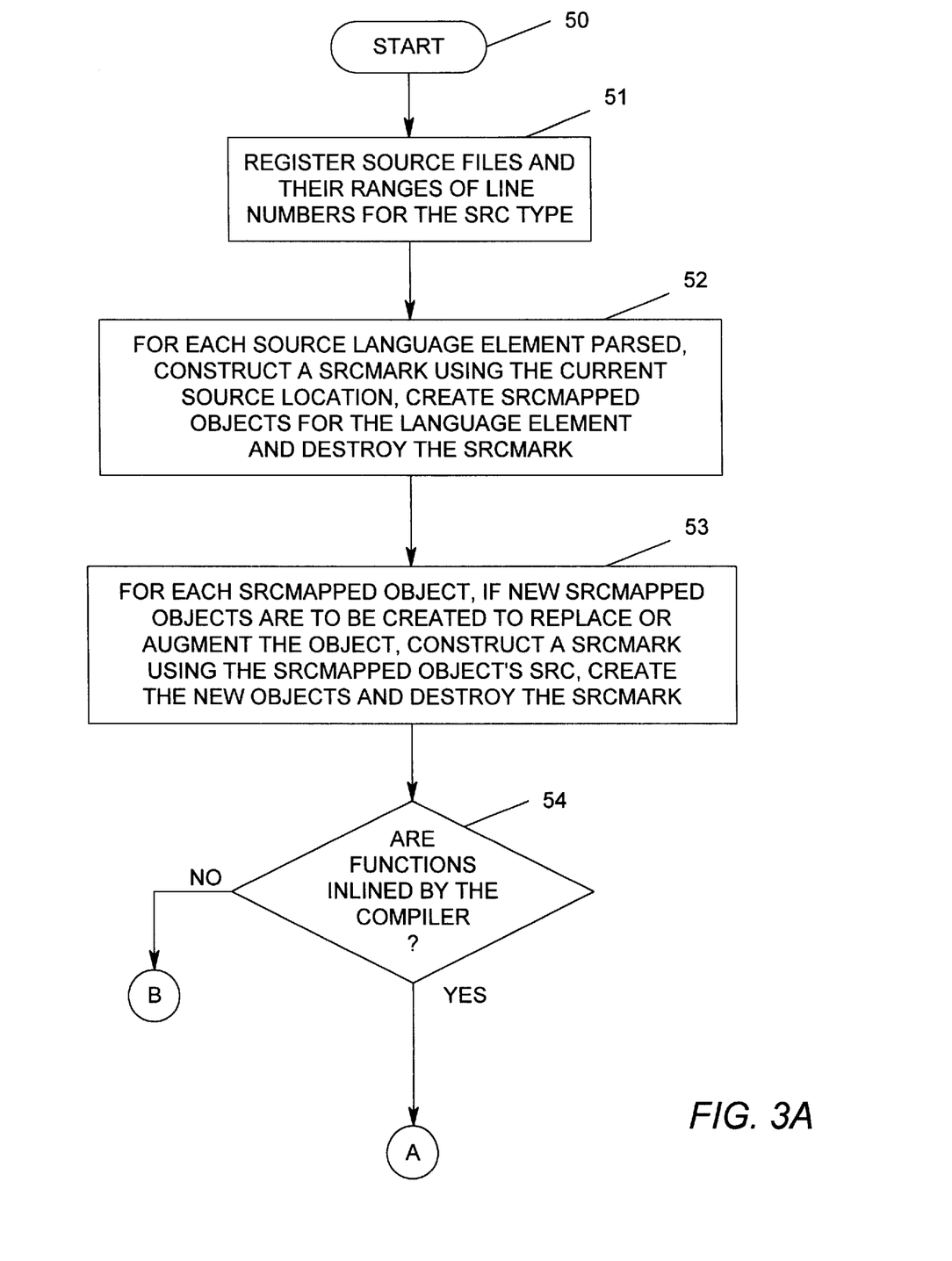
FIGS. 3A and 3B combined form a flow chart of the process by which the compiler uses the three types employed by the present invention.
Figure 3B:
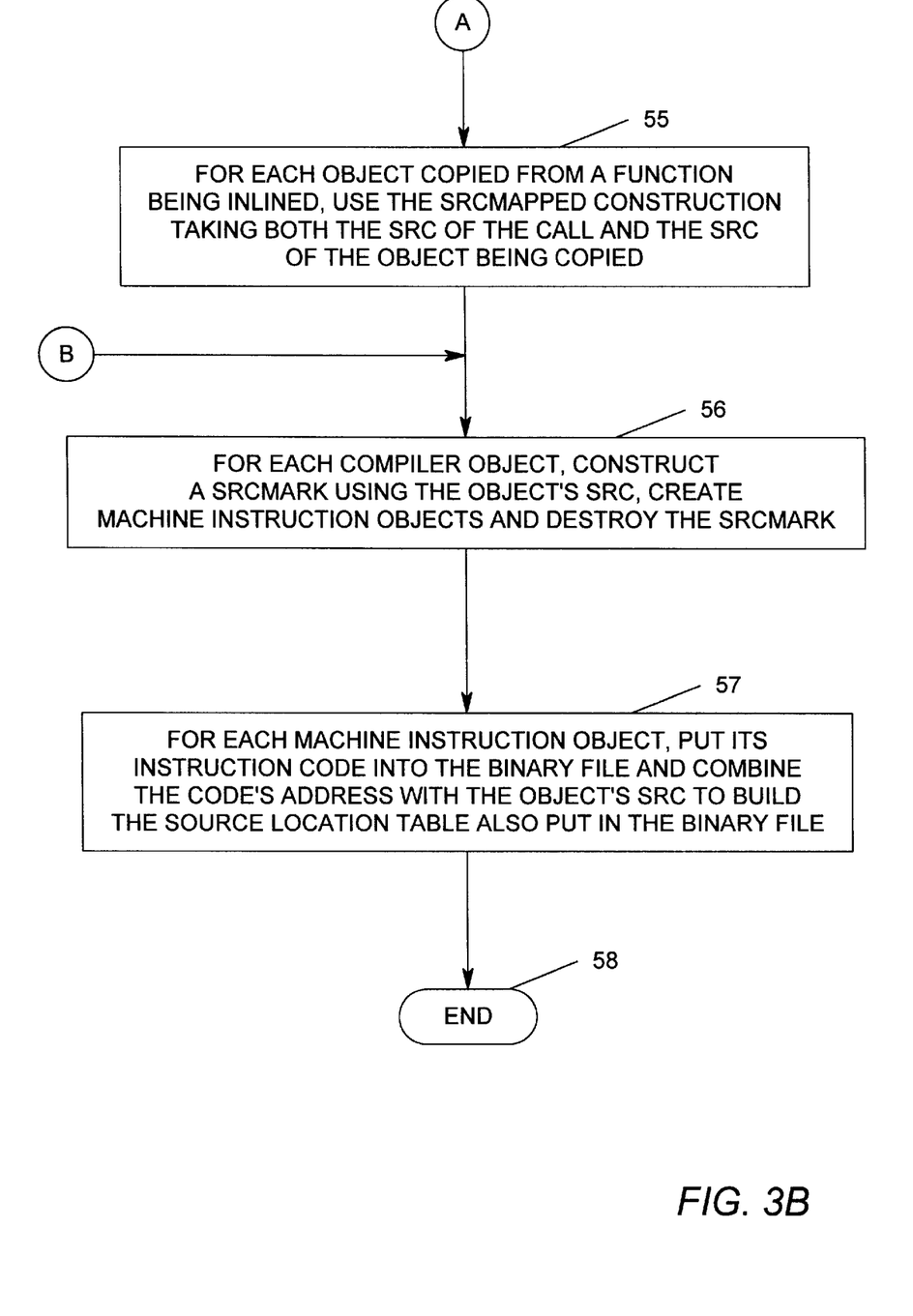

Referring now to FIGS. 3A and 3B, a flow chart illustrates the process by which the compiler 20 uses the three types alluded to hereinabove at various stages of compilation. It is pointed out at this juncture of the description that the steps of the present invention and illustrated herein are tied to the steps of how a compiler works. For example, a compiler parses program elements and the present invention does not—it uses the parsed elements. The process begins with a start bubble 50 followed by a process step of registering source files and their ranges of line numbers for the Src type (block 51). Then, as each language element is parsed, a Src object is created for its source location, and the Src object is used to construct a SrcMark in automatic storage such that the SrcMark is constructed when its Src is to be used for newly created compiler objects, and the SrcMark is destroyed when its Src is no longer to be used. This process step is illustrated by the block 52.

Language elements tend to be processed hierarchically and sometimes recursively, so there can be more than one SrcMark object at one time. Compiler objects, such as those for declarations, statements, expressions, and so on, have a base type of SrcMapped. Whenever one of these objects is created, it implicitly picks up the Src of the most recent SrcMark.

Following the above, processing of each SrcMapped compiler object is depicted by a block 53 wherein, if new objects are to be created to replace or augment the object, a SrcMark object is again created, this time using the Src-Mapped object's Src. This causes the original Src to be implicitly propagated into the new objects. An inquiry is next made as to whether or not functions are inlined by the compiler (diamond 54). If the answer to this inquiry is yes, then the process illustration continues in FIG. 3B as depicted by a connector A. On the other hand if the answer is no, then the process illustration continues in FIG. 3B at a connector B.

Referring now to FIG. 3B at the connector A, for each object copied from a function being inlined into the place of a call on the function, a special construction of SrcMapped is used which gives it both the Src of the call and the Src of the object being copied (block 55). The copied object then has a Src representing an inlined call history. Note that either or both of the two Src objects used by the SrcMapped construction can already be inlined call histories.

As machine instruction objects are generated for each compiler object, such as a statement or expression, a Src-Mark is created with the object's Src. Machine instruction objects also have a base type of SrcMapped. So each machine instruction object implicitly picks up its Src from the most recent SrcMark (block 56).

Finally, as the compiler goes through the sequences of machine instruction objects in order to put machine instruction codes into the binary file, it uses the Src object of each instruction object to identify changes in source location details in order to indicate those changes in a table also put in the binary file (block 57). Following this step the process is ended (bubble 58).

The following types are defined by the apparatus and method of the present invention:

1. An object type, Src, identifies a source location, and where inlining has occurred, a list of inlined source locations. Details of the Src type are not included herein; however, the ability to copy Src objects is a requirement of the present invention. Also, the Src type supports an operation indicating whether or not a Src is null.

2. An object type, SrcMark, identifies a Src object to be related to new compiler objects. SrcMark objects are declared in automatic storage where they are constructed and destroyed as blocks of compiler code are entered and exited. SrcMark objects share a global variable of type Src which holds the current Src for new compiler objects. A SrcMark object has one instance variable of type Src which contains the current Src saved at the time of the SrcMark object's construction. The following operations are defined by the SrcMark type:

a. Construction of a SrcMark object takes a Src object as an argument. If the Src argument is not null, it becomes the new current Src. (See FIG. 4)

b. Destruction restores the saved Src as the current Src. (See FIG. 5)

3. An object type, SrcMapped (see FIG. 2), is the base type of the many types of compiler objects that are associated with source locations. The SrcMapped type defines one instance variable of type Src, which holds the Src associated with a SrcMapped object. These operations are defined for each SrcMapped object:

a. Construction with no argument that associates the constructed object with the Src of the current SrcMark.

b. Construction with a Src argument that associates the constructed object with that Src.

c. Construction with a Src argument representing a function call and a Src argument representing a line of an inline function definition. It associates the constructed object with the compound Src representing the Src argument for a line of the function definition inlined at the specified Src of the function call.

d. An accessor that returns the associated Src.

e. An operation taking a Src argument that associates the Src object with the SrcMapped object.

Figure 4:
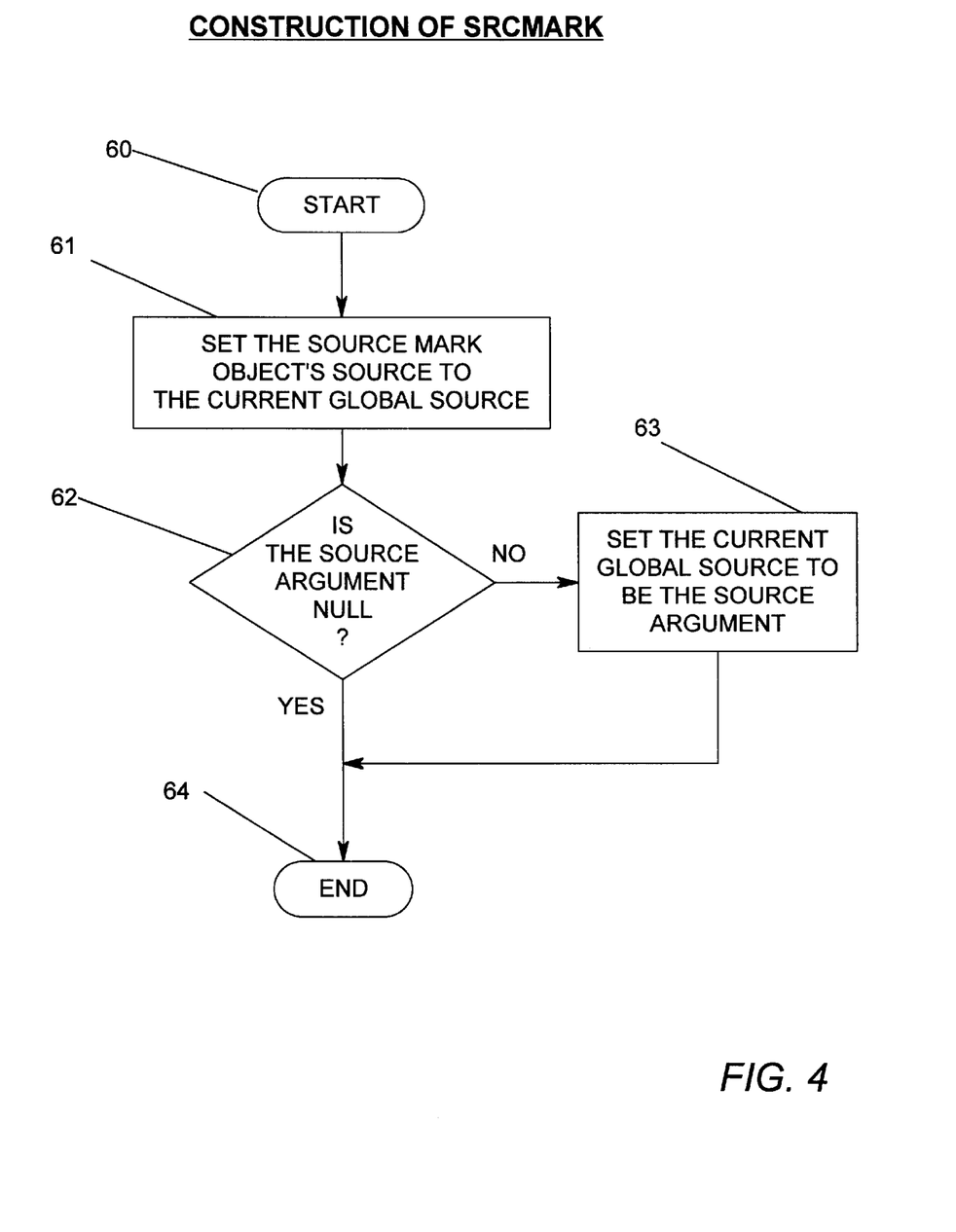
FIG. 4 is a flow chart illustrating the process for construction of a Source Mark ("SrcMark") object.

Referring now to FIG. 4, a flow chart illustrating the process for construction of a Source Mark ("SrcMark") object is shown. The process begins with a start bubble 60 followed by a process step of setting the source mark object's source to the current global source (block 61). Next, an inquiry is made as to whether or not the source argument is null (diamond 62). If the answer to this inquiry is no, then the current global source is set to be the source argument (block 63). Following this, or if the answer to the inquiry in the diamond 62 is yes, the process ends (bubble 64).

Figure 5:
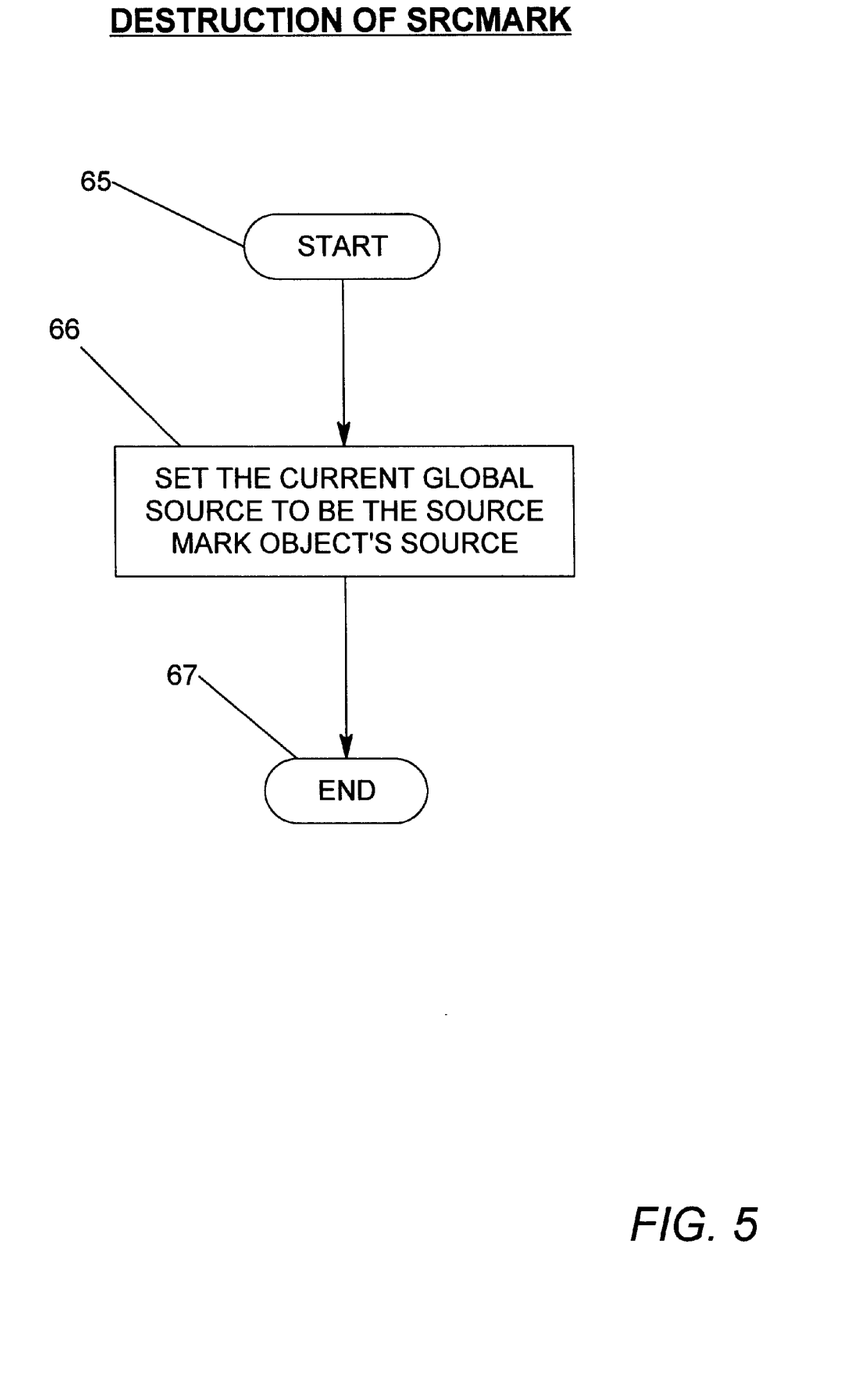
FIG. 5 is a flow chart illustrating the process for destruction of a Source Mark ("SrcMark") object.

Referring now to FIG. 5, a flow chart illustrating the destruction of SrcMark is shown. The process begins with a start bubble 65 followed by a process step of setting the current global source to be the source mark object's source (block 66). The process next ends (bubble 67).

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In an object-oriented apparatus stored in the memory of a computer system a method for propagating source code locations into objects in a compiler, hereafter compiler objects said method comprising the steps of:

a. for each source language element parsed by said compiler, constructing a source mark object using a source object created for the current source location as a source argument, creating source mapped objects for said language element, and destroying said source mark object;

b. for each source mapped object, constructing a source mark object using said source mapped object's source object as a source argument, creating new source mapped objects, and destroying said source mark object; and, c. wherein each of said steps of constructing a source mark object further comprises:
 1) setting an instance variable of said source mark object to a global source;
 2) determining if source argument is null, and if not; and,
 3) setting said global source to said source argument.

2. The method as in claim 1 further including:

d. determining if functions are inlined by said compiler, and if so;

e. for each source mapped object copied from a function being inlined replacing a call on said function, at a call location, using a source mapped construction taking as arguments both a source object from said call and a source object from said source mapped object being copied;

f. for each compiler object, constructing a source mark object using said compiler object's source object and creating machine instruction objects and destroying said source mark object; and, g. for each machine instruction object, putting said machine instruction code into a binary file and combining said instruction code's address with said machine instruction object's source so as to build a source location table, which is also stored in said binary file.

3. The method as in claim 2 wherein said functions are not inlined by said compiler, further comprising:

h. for each compiler object, constructing a source mark object using said compiler object's source object and creating machine instruction objects and destroying said source mark object; and, i. for each machine instruction object, putting said machine instruction code into a binary file and combining said machine instruction code's address with said machine instruction object's source object so as to build a source location table, which is also stored in said binary file.

4. The method as in claim 1 wherein it is determined that said source argument is null further comprising the step of ending the method.

5. The method as in claim 1 wherein said step of destructing a source mark object comprises the step of setting a current global source to be said source mark object's source object.

6. In an object-oriented apparatus stored in the memory of a computer system a method for propagating source code locations into objects in a compiler, hereafter compiler objects said method comprising the steps of:

a. for each source language element parsed by said compiler, constructing a source mark object using a source object created for the current source location as a source argument, creating source mapped objects for said language element, and destroying said source mark object;

b. for each source mapped object, constructing a source mark object using said source mapped object's source object as a source argument, and creating new objects and destroying said source mark object;

c. determining if functions are inlined by said compiler, and if so;

d. for each source mapped object copied from a function being inlined replacing a call on said function, using a source mapped construction taking as arguments both a source object from said call and a source object of said source mapped object being copied;

e. for each compiler object, constructing a source mark object using said compiler object's source object and creating machine instruction objects and destroying said source mark object;

f. for each machine instruction object, putting machine instruction code into a binary file and combining said instruction code's address with said machine instruction object's source object so as to build a source location table, which is also stored in said binary file; and, g. wherein each of said steps of constructing a source mark object further comprises:
 1) setting an instance variable of said source mark object to a global source;
 2) determining if source argument is null, and if not; and,
 3) setting said global source to said source argument.

7. The method as in claim 6 wherein said functions are not inlined by said compiler, further comprising:

h. for each compiler object, constructing a source mark object using said compiler object's source object and creating machine instruction objects and destroying said source mark object; and, i. for each machine instruction object, putting said machine instruction code into a binary file and combining said machine instruction code's address with said machine instruction object's source object so as to build a source location table, which is also stored in said binary file.

* * * * *